Figure 1:
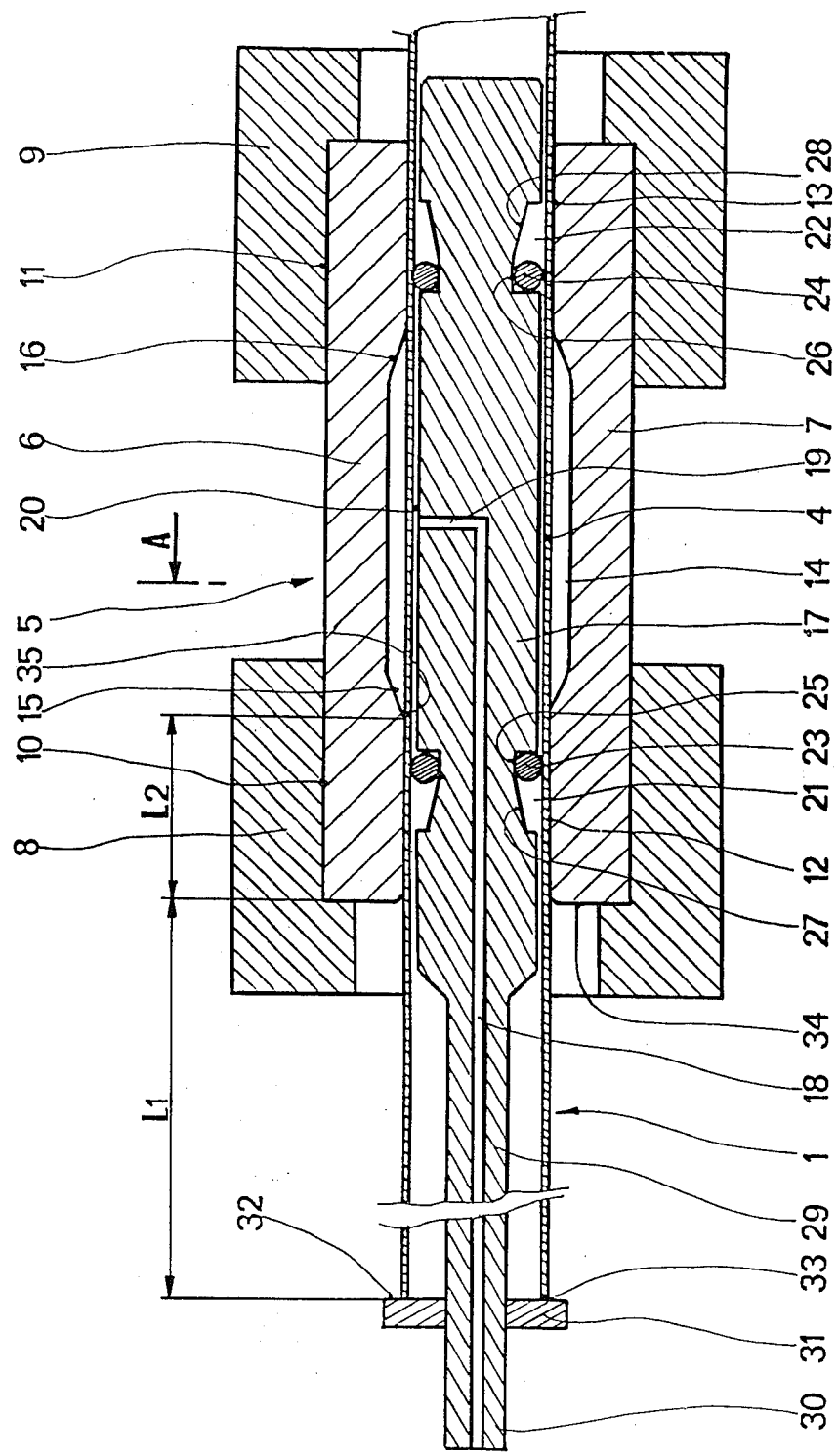

United States Patent [19]
Galle et al.

[11] 4,418,556
[45] Dec. 6, 1983

[54] PRECISION LOCAL EXPANSION SHAPING PROCESS AND APPARATUS FOR METAL TUBES OF SUBSTANTIAL LENGTH

[75] Inventors: Serge Galle; Jerome Hautdidier, both of Montreuil-Juigne; Christian Soulet, Ugine, all of France

[73] Assignee: Compagnie Europeenne du Zirconium Cezus, Paris, France

[21] Appl. No.: 397,217

[22] Filed: Jul. 12, 1982

[51] Int. Cl.³ .............................................. B21D 22/10
[52] U.S. Cl. .................................... 72/62; 29/421 R; 72/58
[58] Field of Search .................... 29/421 R; 72/54, 58, 72/59, 60, 61, 62, 63

[56] References Cited

U.S. PATENT DOCUMENTS

| | | |
|---|---|---|
| 1,834,128 | 12/1931 | Langenberg . |
| 1,879,663 | 9/1932 | Dreyer . |
| 1,886,831 | 11/1932 | Murray . |
| 2,222,762 | 11/1940 | Debor et al. . |
| 2,460,580 | 2/1949 | Huber . |
| 2,770,874 | 11/1956 | Lindow . |
| 2,861,530 | 11/1958 | Macha . |
| 2,963,562 | 5/1960 | Watts et al. . |
| 3,487,668 | 1/1970 | Fuchs, Jr. .......................... 72/55 |
| 3,625,040 | 12/1971 | DeGain .............................. 72/59 |
| 4,052,872 | 10/1977 | Herr .................................... 72/62 |
| 4,187,709 | 2/1980 | Legate et al. ...................... 72/56 |
| 4,359,889 | 11/1982 | Kelly ................................... 72/62 |

FOREIGN PATENT DOCUMENTS

| | | |
|---|---|---|
| 558301 | 4/1955 | Belgium . |
| 682315 | 11/1966 | Belgium . |
| 1452773 | 7/1969 | Fed. Rep. of Germany . |
| 1312726 | 11/1952 | France . |
| 1136143 | 5/1957 | France . |
| 523962 | 7/1940 | United Kingdom . |

*Primary Examiner*—Leon Gilden
*Attorney, Agent, or Firm*—Dennison, Meserole, Pollack & Scheiner

[57] ABSTRACT

Process and apparatus for expansion shaping of at least one localized region in a running portion of the wall of a tube of substantial length, wherein the distance between the expanded region and one of the ends of the tube is to be adjusted with precision; comprising disposing a die around the tube in the region to be shaped, the die comprising an expansion chamber between two cylindrical bearing surfaces, introducing a mandrel into the interior of the tube in the portion thereof which is within the die and delimiting an annular space between the mandrel and the tube, by two sealing regions disposed on respective sides of the expansion chamber at the location of the cylindrical bearing surfaces of the die, introducing a pressure fluid through the mandrel into the annular space, and increasing the pressure of the fluid until the tube becomes deformed against the walls of the expansion chamber.

7 Claims, 4 Drawing Figures

PRECISION LOCAL EXPANSION SHAPING PROCESS AND APPARATUS FOR METAL TUBES OF SUBSTANTIAL LENGTH

The process according to the invention is concerned with shaping the wall of metal tubes which are several meters in length, in regions which are located with precision, at a spacing from the ends thereof.

The process more particularly concerns expansion shaping of thin-wall metal tubes in localized regions thereof, such as the tubes used for guiding control or shutdown bars in nuclear reactors. For some uses, such tubes must comprise one or more regions of increased diameter, being of relatively short length, and being disposed at a relatively large spacing from one end or the other of the tube, that spacing being determined with a very high degree of precision.

Methods for shaping an expanded region in a metal tube are already known. Thus, U.S. Pat. No. 3,625,040 describes a process for expansion shaping a tube, wherein the tube to be expanded is placed within a die after the tube has been plugged at both ends. A hydraulic fluid is then introduced into the tube and the fluid is put under pressure so as to press the walls of the tube against the walls of the die. Such an arrangement could not be used for shaping tubes which are several meters in length, in localized regions thereof, or else it would require the use of dies of very large dimensions, which are extremely expensive to produce and very difficult to operate.

French patent No. 1 312 726 describes a process for producing metal bellows arrangements, which involves producing a bellows arrangement by hydraulic expansion of a thin metal sleeve of cylindrical shape. For that purpose, the process uses a die comprising a housing or recess into which the end of the sleeve is engaged, in such a way that the end of the sleeve bears against a fixed wall which forms the end of the housing. The sleeve is held against the end of the housing either by friction against the cylindrical wall or by bending over the end edge portions of the sleeve and gripping those portions by means of a ring which is fixed with respect to the end of the housing by screw means. The annular wall of the die is of the corrugated shape which is to be imparted to the sleeve by expansion thereof. A mandrel which is also fixed to the end of the housing and which carries sealing rings permits a fluid to be introduced, the pressure of the fluid being applied to the inside wall surface of the sleeve only in the region thereof which is engaged in the die, so as to shape the sleeve in an expansion mode and cause it to conform to the corrugation of the die. Such an apparatus is suitable for shaping a metal tube in a region which is disposed in the immediate vicinity of the end of the tube, but it could not be easily used when the region to be shaped is at spacing from the end of the tube.

A search have been made for a possible way of expanding a limited region of a thin-walled metal tube, which region may be disposed at a distance from the ends of the tube. Efforts were also made to find a possible way of positioning the expanded region with respect to a given end of the tube in such a way that the positioning can be very easily reproduced, with the spacing between the given end of the tube and the closer end of the expanded region being reproducible from one tube to another, with an average variation of less than ±0.2% with respect to the nominal dimension.

The apparatus according to the invention permits the desired results to be attained. It comprises a dismantable tubular die which includes an expansion chamber and, on respective sides of said chamber, two cylindrical bearing surfaces whose inside diameter is substantially equal to the outside diameter of the tube to be expanded, taking into account the clearance required to permit the tube to be introduced into the die, the bearing surfaces having different coefficients of friction with respect to the surface of the tube to be expanded.

A mandrel which is slightly smaller in diameter than the tube which is to be expansion-shaped is housed within the tube and penetrates into the part thereof which is disposed within the die; it comprises an internal conduit which is substantially parallel to the axis and which may be connected to an external pressure fluid source. By virtue of a radial aperture, the conduit communicates with the annular space between the mandrel and the tube. That space is defined by two regions in which a seal is made as between the mandrel and the tube, on respective sides of the expansion chamber, at the location of the cylindrical bearing surfaces of the die. The sealing effect is in most cases attained by means of sealing joints such as metal or elastomer seals.

Preferably, each sealing region comprises an annular groove which is formed around the mandrel and which contains at least one toric seal, for example of elastomer. The groove, which is wider than it is deep, includes a region of maximum depth at the side towards the annular space that it delimits, at least one toric seal being disposed in said region in the rest condition, and a region of decreasing depth which goes to the opposite edge of the groove.

Preferably also, the two cylindrical bearing surfaces of the die are made of different materials, one of the materials having a relatively high coefficient of friction and the other having a relatively low coefficient of friction which can be further reduced, if necessary, by a surface treatment or by lubrication.

The invention also concerns a process for the expansion shaping of at least one localized region in a running portion of the wall of a tube of substantial length, the distance L of that region from one of the ends of the tube having to be determined with precision, comprising the following steps:

(1) Placing around the tube in the region to be shaped, a die comprising an expansion chamber between two cylindrical bearing surfaces having different coefficients of friction with respect to the metal of the tube.

(2) Introducing into the tube, in the portion thereof which is within the die, a mandrel comprising an internal conduit with communicates the annular space between the mandrel and the tube with an external pressure fluid source, the annular space being delimited by two sealing regions disposed on respective sides of the expansion chamber, at the locations of the cylindrical bearing surfaces of the die, and (3) Introducing into the annular space by way of the internal conduit of the mandrel, a fluid from the external pressure fluid source, the pressure of the fluid being increased until the tube is deformed and is applied against the walls of the expansion chamber of the die.

Preferably, the die is so oriented that the bearing surface having the high coefficient of friction is towards the end of the tube with respect to which the spacing of the expansion region is to be precisely determined.

In accordance with a further feature of the process according to the invention, before expansion, the distance $L_1$ between the end face of the die which is towards the bearing surface having the higher coefficient of friction and the corresponding end of the tube is adjusted in such a way that, taking account of the distance $L_2$ between the end face of the die and the origin of the expanded region of the die, the relationship is as follows:

$$L = L_1 + L_2$$

L being, after expansion, the distance between the end of the tube and the point of origin of the expanded region.

The non-limiting example and the drawings hereinafter will permit the features of the apparatus according to the invention and the expansion shaping process which uses that apparatus to be more clearly appreciated.

Figure 2:
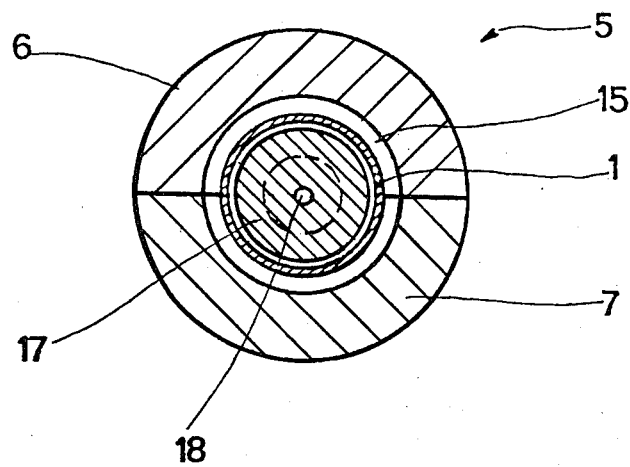
Figure 3:
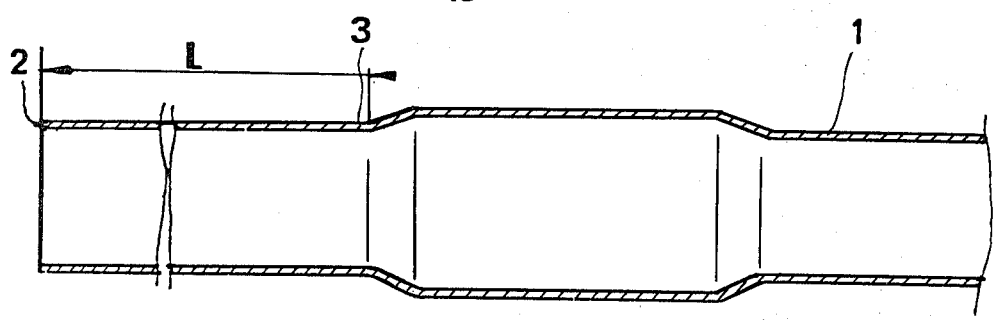
Figure 4:
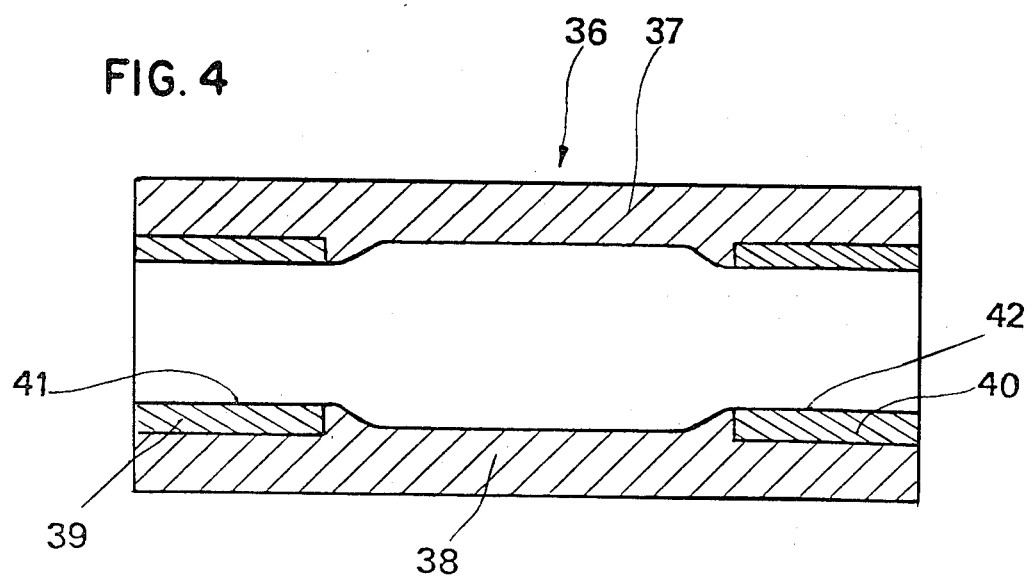

In the drawings:

FIG. 1 is a view in longitudinal section of an embodiment of the apparatus according to the invention, FIG. 2 is a view in section taken along line A in FIG. 1, FIG. 3 is a sectional view of a portion of a tube of substantial length after expansion shaping by means of the apparatus according to the invention, and FIG. 4 shows a particular embodiment of the die according to the invention.

FIG. 1 shows an apparatus according to the invention, which is used for producing by means of an expansion step, a localized region of increased diameter in a running portion of a thin-walled metal tube of substantial length, wherein the spacing between one of the ends of the tube and the closer end of the beginning of the increased-diameter region is to be equal to a predetermined length L, to within a tolerance of ±0.2%.

FIG. 1 shows a tube 1 comprising a zirconium-base alloy of the zircaloy 2 type in accordance with standard ASTM B 353-71, being 10 mm in internal diameter, 0.5 mm in thickness and about 4 m in length.

It is proposed that the internal diameter of the tube should be increased, by raising it to a dimension of 12 mm over a length of 50 mm. It is also proposed that the expansion operation be carried out in such a way that the length L of the non-deformed portion of the tube, which extends between the end 2 of the tube and the beginning of the expanded region 3 (see FIG. 3) is equal to 500 mm, with a degree of accuracy of ±1 mm. To achieve that result, the region 4 (see FIG. 1) of the tube to be expanded is introduced into an axially symmetrical die 5 which can be dismantled to form two parts 6 and 7 which are held in place by means of two annular assembly rings 8 and 9. Each of the rings 8 and 9 comprises a cylindrical housing or recess 10, 11, into which engages an end of the die with the minimum clearance required for assembly and dismantling.

At each of its ends, the die comprises a cylindrical bearing surface 12, 13, the diameter of which is equal to the outside diameter of the tube 1, that is to say, 11 mm, plus the minimum clearance required to permit the tube 1 to be engaged therein, and an expansion chamber 14 which is cylindrical in the illustrated embodiment, being 13 mm in inside diameter and 50 mm in length. Fillet portions 15 and 16 connect the regions of different diameters.

A cylindrical steel mandrel 17 which is 9.8 mm in outside diameter and which has thick walls is introduced into the tube 1. The mandrel 17 has an internal conduit 18. A radial duct 19 communicates the conduit 18 with the annular space between the mandrel and the tube 1.

Two annular grooves 21 and 22 are provided around the mandrel on respective sides of the annular space 20. As will be seen from FIG. 1, each of the grooves houses at least one toric seal 23 or 24, and the grooves are variable in depth, with a length which is clearly greater than their maximum depth. Each groove comprises a region 25, 26 of maximum depth, on the side towards the annular space 20, which in the rest condition houses the toric seal. The above-mentioned depth is such as to be slightly less than the diameter of the seal. In the illustrated embodiment for example the arrangement uses seals which have a torus diameter of 2 mm, while the maximum depth of the groove is 1.8 mm. The bottom of each of the grooves has a second region 27, 28 of substantially conical shape, the depth of which decreases in a direction away from the annular space 20.

The angle of slope of the generatrix of the conical portion is for example 30° with respect to the axis of the mandrel. The total width of the groove is about three times the diameter of the toric seal. The mandrel 17 is extended by a connecting tube 29 which is also cylindrical and which is made of steel and which is smaller in diameter than the mandrel. The tube may be connected by means of its end 30 to a means for introducing fluid (not shown). A ring 31 is screwed to the end of the connecting tube. It will be seen that the dimensions of the mandrel are such that, when it is introduced into the tube 1 to be expanded and the assembly is placed within the die 5, the toric seals 23 and 24 and the grooves 21 and 22 containing the seals are disposed facing the cylindrical entry surfaces 12 and 13 of the die, on respective sides of the wall 14 of the expansion region.

It will be seen that, by virtue of the ring 31, the position of which on the tube 29 can be easily adjusted, the end 33 of the tube 1 can be moved into a condition of abutting against the face 32 of the ring, and the distance $L_1$ between the end 33 of the tube 1 and the end face 34 of the die 5 can then be adjusted. Taking into account the distance $L_2$ between the end face 34 of the die and the beginning 35 of the connecting region 15, $L_1$ is so adjusted as to give the following relationship:

$$L = L_1 + L_2$$

In the embodiment illustrated, L = 500 mm.

Finally, the expansion operation is performed by introducing a fluid, preferably liquid, from the end 30 of the tube 29 which is connected to a pressure fluid introducing means, the fluid being for example water or oil and passing through the conduit 18, issuing therefrom by way of the radial duct 19, and therefore applying its pressure to the inside wall surfaces of the tube 1 in the annular space 20.

By progressively increasing the pressure of the fluid, it is found first of all that the toric seals 23 and 24 are gradually urged towards the outside edges of the grooves 21 and 22. Such movement, towards regions in which the depth of the groove decreases, causes the toric seals to be gripped more tightly and therefore makes it possible to preserve an excellent sealing effect, even when the pressure of the fluid reaches values of the order of 1000 bars. The pressure of the fluid is increased until the forces that it applies to the inside wall surfaces of the tube exceed the elastic limit thereof, and it is applied against the walls 14 of the die. In the present embodiment, the pressure used is of the order of 800 bars.

This expansion effect is accompanied by a sliding movement of the cylindrical portions of the tube which are in the vicinity of the expansion region and it is found that, after expansion, the end 33 of the tube no longer bears against the face 32 of the ring 31 and has been retracted therefrom by several millimeters. Repeated tests have shown that such sliding movement cannot be reproduced from one operation to the other.

If therefore the precision with which the value of L is determined is to be increased, which is necessary in particular in regard to uses involving nuclear reactors, the expansion apparatus according to the invention must be further improved. For that purpose, the idea was conceived of blocking the sliding movement of the tube in the axial direction with respect to the die and the mandrel, at the location of one of the two bearing surfaces of the die, while on the other hand promoting sliding movement of the tube at the other bearing surface.

If, in the embodiment shown in FIG. 1, it is possible to prevent sliding movement of the tube 1 on the bearing surface 12 while permitting it to slide easily on the other bearing surface 13, it will be appreciated that, after the value of $L_1$ has been adjusted in the above-indicated manner, there is no longer any reduction in length of the part of the tube between the end face 34 of the die and the surface 32 of the ring 31 in the course of the expansion process. When the expansion process has been concluded, the end 33 of the tube 1 remains in contact with the surface 32 and the length $L=500$ mm has not changed. On the other hand, it will of course be noted that there is a substantial reduction in the length of the tube, on the other side of the mandrel. However, that reduction in length occurs in such a way that it can be reproduced, insofar as the dimensional characteristics and mechanical properties can be reproduced from one tube to another. Therefore, by blocking the sliding movement of the tube at one of the bearing surfaces of the die, it is possible to cause expansion of the tube without finding a substantial variation in the distance between the end of the tube which is towards that bearing surface of the die. By virtue of the action of blocking the sliding movement of the tube, it is also possible, when expanding tubes having very similar physical and dimensional characteristics, to find that the distance between the other end of the tube and the die is reduced in the course of the expansion operation in such a manner that it can be very well reproduced, and can therefore be calculated beforehand.

In practice, there is a fairly large number of ways of preventing sliding movement of the tube at one of the bearing surfaces and promoting such sliding movement at the other. In particular, it is possible to prevent the sliding movement at one of the two bearing surfaces of the die by increasing the clamping action in respect of the corresponding toric seal: increased torus diameter or reduced depth of groove. It is also possible, and this is the mode of operation which is used most frequently, to modify the coefficient of friction of one of the bearing surfaces with respect to the other. For that purpose, each of the two surfaces 12 and 13 may be subjected to suitable surface treatments.

A particularly effective method is shown in FIG. 4 and comprises housing an insert of a suitable material in at least one of the above-mentioned surfaces. FIG. 4 shows a die 36 in two halves 37 and 38 resting against each other along an axial plan, which is similar in design to the die 5 shown in FIGS. 1 and 2. This die comprises two annular inserts 39 and 40 which each of them are also in two halves and which are disposed in the entry regions of the die.

The insert 39 is made of a material having a poor coefficient of friction with respect to the metal of the same tube. The insert 39 may be formed in particular by means of a treated steel, the surface 41 of which that is in contact with the tube will not be lubricated. In some cases, the steel forming the die may be used as a bearing surface, without having recourse to an insert.

For making the insert 40, it is possible to use a carbide such as tungsten carbide or a bronze or another material with a low coefficient of friction. In addition, if appropriate, it is possible lightly to lubricate the surface 42 of the insert 40, or to carry out a suitable surface treatment thereon.

The operations of setting the inserts in place, fixing them to the metal of the die and machining them with the desired degree of accuracy can be carried out using any suitable methods which are well known to the man skilled in the art.

In the illustrated embodiment, the insert 30 was made of steel and the insert 40 was made of tungsten carbide.

When using a die constructed as described above and fitted in the above-described manner, it was found that, in the course of the expansion operation, the tube 1 was held by the internal pressure in a position of bearing against the cylindrical surface 41 of the insert 39, without any sliding movement. In contrast, at the cylindrical surface 42 of the insert 40, it was found that there was a sliding movement of the tube over several millimeters along the axis thereof, towards the interior of the die, at the moment of the expansion operation. The length L of the tube which had been adjusted to 500 mm before expansion had not altered after expansion.

In certain cases, as indicated hereinbefore, it is possible not to use inserts, and instead to perform a different surface treatment at the entry regions of the die. In fact, it is only necessary to produce a significant difference in the coefficient of friction of one of the bearing surfaces with respect to the other.

Other embodiments of the apparatus according to the invention may be envisaged, and are also subject-matter of the present invention.

In particular, it is possible to produce a die which does not have an axial connecting plane, but wherein at least one of the two entry regions can be dismantled so as to permit the tube to be extracted from the die after expansion.

Also, in some cases, it is possible to envisage housing two toric seals side by side in each of the grooves 21 and 22. In that case the region 25, 26 of maximum depth of each groove must be enlarged to permit the two seals to be set in position.

The above-described expansion shaping process and apparatus can be used for shaping metal tubes of any kind.

They are used with particular advantage for shaping tubes of zirconium alloys for nuclear uses, such as tubes comprising zircaloy 2 or 4. They are also used for shaping tubes of alloyed or non-alloyed titanium, special, stainless or refractory steels, or any other metals or alloys.

Generally, the process and apparatus which are the subject-matter of this invention are used with advantage whether there is a need, on relatively long tubes, to produce one or more increased-diameter regions disposed at a spacing from the ends, being located with a sufficient degree of precision.

Any modifications may be made in the apparatus according to the invention, and the method of use thereof, without thereby departing from the scope of the invention.

We claim:

1. Apparatus for local expansion shaping in a precisely located region of a running part of a cylindrical tube of substantial length, said apparatus comprising a dismantable tubular die open at both ends and including a central expansion chamber, the inside dimensions of which correspond to those of the expanded region to be produced, and, to opposed sides of the expansion chamber, two cylindrical bearing surfaces, the inside diameters of which are substantially equal to the initial outside diameter of the tube to be expanded for an accommodation of the tube within the die; and a mandrel for reception within the die-received portion of the tube, said mandrel including an internal conduit having one end adapted for communication with an external pressure fluid source and a second end laterally directed at a point along the length thereof for communication with, and introduction of pressurized fluid to, an annular space between the mandrel and the tube, said mandrel having compressible seals mounted thereabout at spaced points therealong for sealing engagement with the tube to delimit said annular space between the mandrel and the tube to extend beyond the opposed sides of the expansion chamber into the areas of the cylindrical bearing surfaces of the die; said mandrel including annular grooves thereabout, said grooves being positionable to the opposite sides of the annular space and housing said seals, the grooves being of a transverse width greater than the seals received therein, ech groove transversely extending between an inner side toward the annular space and an outer side outwardly spaced relative to the annular space, each of said annular grooves being variable in depth from a maximum depth at the inner side to a minimum depth at the outer side, each seal being of a height greater than the maximum depth of the corresponding groove and capable of increasing compression between the mandrel and tube upon outward movement of the seal in response to pressure increase in the annular space.

2. Apparatus according to claim 1 wherein the two bearing surfaces of the die have different coefficients of friction with respect to the surface of the tube to be expanded.

3. Apparatus according to claim 2 wherein each of the grooves contains at least one toric seal.

4. Apparatus according to claim 2 wherein at least one of the two bearing surfaces of the die is formed by an insert made of a material having a coefficient of friction with respect to the surface of the tube, which is different from that of the material of the other bearing surface.

5. Apparatus according to claim 2 wherein at least one of the two bearing surfaces of the die is formed by an insert made of a material having a coefficient of friction with respect to the surface of the tube, which is different from that of the material of the other bearing surface.

6. A process for expansion shaping of at least one localized region in a running portion of the wall of a tube of substantial length, wherein the distance between the expanded region and one of the ends of the tube is to be adjusted with precision and, when adjusted, maintained constant during expansion; comprising providing a die with a central expansion chamber and, to the opposite sides thereof, two cylindrical bearing surfaces with different coefficients of friction with respect to the tube, orienting the die with respect to the tube to be shaped in such a way that the bearing surface having the higher coefficient of friction is disposed towards the end of the tube which is to be maintained at a constant distance during the expansion operation, disposing the die around the tube in the region to be shaped, introducing a mandrel into the interior of the tube in the portion thereof which is within the die and delimiting an annular space between the mandrel and the tube by two sealing regions disposed on respective sides of the expansion chamber at the location of the cylindrical bearing surfaces of the die, introducing a pressure fluid through the mandrel into the annular space, and increasing the pressure of the fluid until the tube becomes deformed against the walls of the expansion chamber.

7. A process according to claim 6 wherein, before expansion, the distance $L_1$ between one end face of the die and the corresponding end of the tube is so adjusted that, taking into account the distance $L_2$ between the one end face of the die and the corresponding origin of the expanded region of the die, the following relationship applies:

$$L = L_1 + L_2$$

L being the distance between the one end of the tube and the point of origin of the corresponding expanded region of the die which is to be kept constant while the expansion operation is carried out.

* * * * *